Sept. 18, 1956
S. KOHN ET AL
2,763,154
METHOD OF STUDYING THE DISTRIBUTION
OF STRAIN IN MECHANICAL PARTS
Filed June 8, 1951
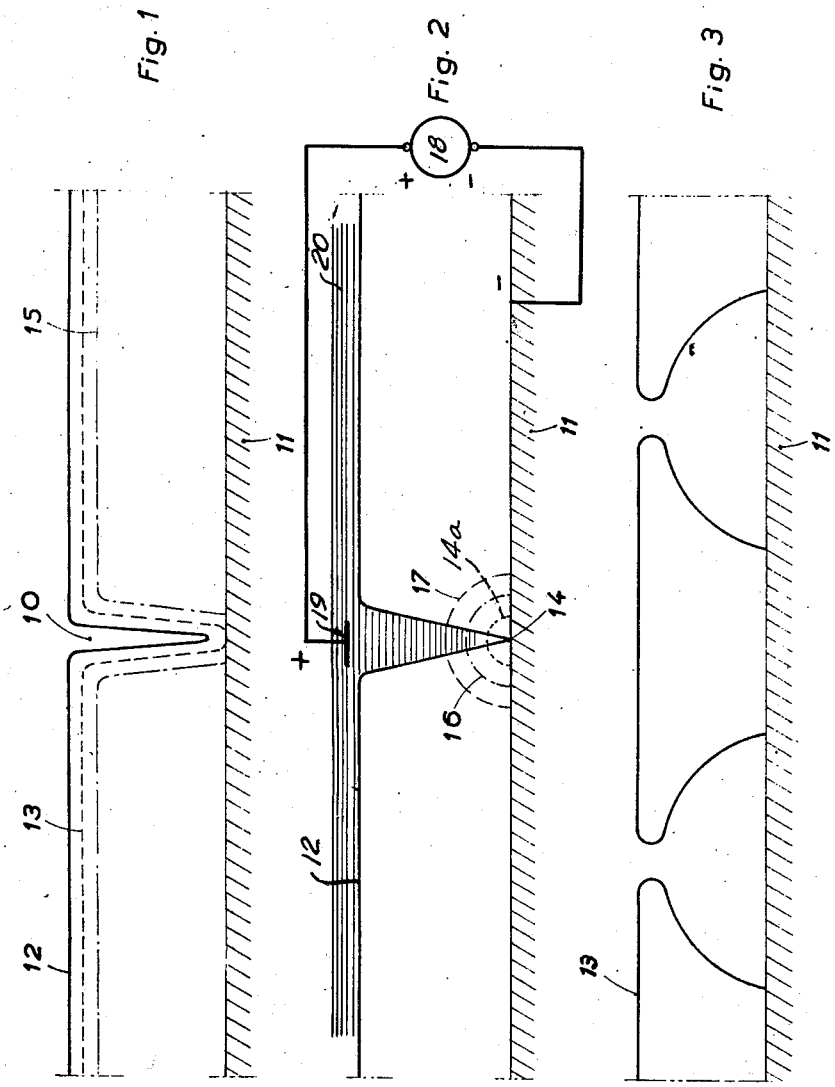
Inventors:
Samuel Kohn and
Hervé Guyot
By:

2,763,154
METHOD OF STUDYING THE DISTRIBUTION OF STRAIN IN MECHANICAL PARTS

Samuel Kohn and Hervé Guyot, Paris, France, assignors to Office National d'Etudes et de Recherches Aeronautiques, Chatillon-sous-Bagneux, France Application June 8, 1951, Serial No. 230,638

Claims priority, application France June 13, 1950

8 Claims. (Cl. 73—88)

This invention relates to a method of analyzing the distribution of strain in mechanical parts.

Methods are already known whereby strains developed in mechanical parts are studied by visualizing isostatic tension lines produced on the surface of a part coated beforehand with a fragile film and then subjected to mechanical stresses.

However, the hitherto suggested methods are complicated and the necessary means therefor are both costly and intricate; besides the results obtained are not always clear.

It is therefore an object of this invention to provide a novel method of visualizing the lines of isostatic tension, which may be carried out most easily even by operators not conversant with the art.

Another object of this invention is to provide a method, which may be carried out without any special or costly equipment but merely with means commonly available in conventional industrial plants.

It is a further object of this invention to provide a method for the above-defined purpose, which may be carried out safely and, in particular, without using any toxic products.

Moreover, it is an object of this invention to provide a method of the above-defined character whereby cracks obtained by the application of stress to a coated mechanical part are much more visible than in hitherto known processes, all other conditions being equal.

It is another object of this invention to provide such a method, by which the tensions generated in the mechanical part by the applied strain are easily localized.

Another object of this invention is to provide a novel product to be used for making a fragile cracking coating on a mechanical part and which is cheap, easily preserved and has a wide versatility of use.

It is already known in the art to produce a fragile film from a resin. In most cases resin in powder form is used; the powder is spread over the part to be tested; in some cases the part is heated beforehand whilst in others the part is heated after the resin powder has thus been applied thereto.

In all cases, the film obtained is not so homogeneous and uniform as desired so that, when stresses are applied to the part, the resulting cracks do not constitute a very reliable basis in the examination of strain, and extend further, that is are not restricted to the area actually subjected to this tension.

Another method known in the art consists in using the resin in varnish form obtained, in most instances, by dissolving the resin in carbon disulphide. The varnish is then applied to the mechanical part and the latter dried until a fragile film is formed thereon.

The working-out of this latter method requires a conditioned atmosphere, as far as temperature or air-humidity is concerned, in order that the drying of the varnish occurs accurately in the expected conditions, and that the varnish get the required initial tension, in consequence of its shrinkage.

However, the application of this process is quite dangerous in that it uses carbon disulphide, an extremely toxic product, as a solvent. Besides, this method is costly owing to the high cost of this solvent, and its practice is time consuming since the drying time is generally of 12 to 24 hours.

This invention relates to a novel method of studying and analyzing the distribution of strain in mechanical parts, characterized in that the part to be examined is coated with a varnish, more specifically with a resin varnish, and that the resulting layer is transformed by heating into a film of enamel constituting the desired fragile film which, on stressing the part, will be cracked and thus will demonstrate the characteristics of the strains produced in this part.

The heating step may be carried out in any desired manner, in the simplest way by passing a flame over the varnished part.

The fragile film produced after the heating step is perfectly uniform and homogeneous.

Thus, it is no longer necessary to entrust a highly-skilled operator with the preparation of the parts to be examined, and this is another factor contributing in the low cost of the method.

The varnish coating applied to the part to be examined is transformed by heating into an enamel coating, the solvent being thus completely eliminated and the residue melted. However, the enamel coating obtained is considerably better than the film produced by the prior art, which proposes heating the resin powder for the purpose contemplated.

The application of this method is very easy also because the conversion of varnish into enamel occurs in a very visible fashion. The equally detrimental risks of over-heating or under-heating the varnish are therefore eliminated.

It has been found that when the varnish coating is heated there occurs at certain moments a very visible phenomenon which is either a clarification, a vanishing of bubble or a change of color. Thus, the operator is warned by the occurrence of this phenomenon that a sufficient degree of heating is reached. By stopping the application of heat, an enamel coating or film having the required qualities is obtained.

It is quite likely that at the beginning of the heating time the solvent is evaporated and the resin left, the subsequent fusion of the enamel-forming resin causing the appearance of the above-depicted phenomenon.

With the method of the present invention the solvent may be selected from a much wider range of products than with the hitherto known varnishing processes, which inevitably requires a solvent, which is evaporated by nature and provides a smooth coating. Moreover, the solvent in this known process is to be chosen as not being hygroscopic. Practically only two solvents fulfill these conditions, that is carbon-disulphide and methylene-dichloride.

This invention contemplates more particularly the use among many others of acetone as a resin solvent for making the varnish to be converted into the desired cracking film. The relative innocuousness and low price of acetone are favorable factors in widening the field of application of this method.

It will be noted that in the heretofore known varnish process it was not possible to use acetone varnish. However, it will be understood that the method according to this invention is also successfully applicable with a crackling varnish requiring a solvent other than acetone, for example ether, chloroform, benzene and even carbon-disulphide.

It is to be mentioned that the enamel keeps its qualities whichever are the modifications of the solvent during the storage or after the varnish transformation, particularly as concerns its water-content, of course within reasonable limits; thus, acetone may be used as solvent despite its hygroscopicity, a water-content as high as 5% being without drawback.

A varnish according to this invention will therefore retain its properties in the most diversified conditions of use, both when stored in a container before it is applied to a part and when already applied to this part as a coating adapted to form a fragile film.

Thus, a varnish according to his invention may be applied to mechanical parts, the parts then stored during a relatively long time and finally subjected to the action of heat at the desired moment, for example just before carrying-out the mechanical tests contemplated.

This division of the method in two separate parts in both time and space is a valuable commercial characteristic.

For the production of a varnish according to this invention, a natural resin is treated for bringing its softening point Kramer-Sarnow to a given relatively high value, for instance between 80 and 100° C. It is admitted that the increase of the Kramer-Sarnow point of the resin results from an elimination during the treatment of the natural most volatile plasticizers of the resin.

The method for determining the softening point according to Kramer-Sarnow is, for example, disclosed in "The Chemistry of Synthetic Resins" by Carlton Ellis, New York, 1935, Reinhold Publishing Corporation, pages 1263–1264 and "Asphalts and Allied Substance" by Abraham (5th Edition) vol. II, pages 1064–1071, D. Van Nostrand Company, Inc., New York.

The treated resin is dissolved in a solvent, which is advantageously acetone, as mentioned hereabove, or another solvent, and to this solution a plasticizer is added, which is selected for its non-volatility; as plasticizer, tricresylphosphate has given satisfactory results. Its ratio is comprised for example from 0 to 10 gr. per 100 gr. of basic resin.

This operation, that is firstly the elimination of a plasticizer and then the introduction of another plasticizer, may seem odd. It has the following consequences: During the heating phase, which changes the varnish into enamel, the content of the varnish in plasticizer is qualitatively and quantitatively well known. Thus, the modifications occurring by the heating step relatively to the plasticizing feature of the varnish are known in advance. In this way, a coating is obtained, which has accurately the required crackling properties.

The scope of this invention also includes the addition of a very fine filler powder such as talcum or diatomite to the varnish. This filler may be added either by suspending the powder in the liquid varnish before coating the mechanical parts, or by dusting the latter with this powder after coating but prior to heating the part. It is quite probable that the addition of a very fine powder, by multiplying discontinuities in the enamel coating, promotes the formation of crackles. The sensitiveness of the process is increased accordingly.

This invention also contemplates the combined use of a plasticizer and a very fine powder filler in the preparation of the varnish.

According to a specific embodiment of the invention the filler is selected in view of contributing in the formation, on the part to be tested, of a metal resinate. In this case, metal carbonates may be used as filler agents.

In another embodiment, metal resinates such as alkaline, alkaline-earth, iron, nickel, cobalt, zinc, manganese, aluminum and other resinates may be added to the basic resin.

A very wide range of varnishes having different sensitivenesses may be obtained from two basic varnishes only which are mixed in variable proportions according to the room temperature, the material of which the part is made, the desired degree of sensitiveness and, more generally, the conditions in which the test is carried out.

The following are non-restrictive examples of the compositions of two basic varnishes or reserve solutions:

| Varnish | Basic resin | Plasticizer | Solvent |
|---|---|---|---|
| A | Treated colophony having a softening point, Kramer-Sarnow=85°, 300 grams. | Tricresylphosphate, 10 cc. | Acetone, q. s. 1 l. |
| B | Treated colophony having a softening point, Kramer-Sarnow=90°, 300 grams. | Tricresylphosphate, 3 cc. | Acetone, q. s. 1 l. | whereby q. s. 1 l. signifies the addition to make up one liter of solution.

A natural resin or a mixing of natural resins (rosin, dammar, copal, etc.) is treated (by steam, heating under vacuum, etc.) for bringing its softening point Kramer-Sarnow to a given value, as mentioned hereabove. To this treated resin, a metal resinate or resinates may be added. The treated resin, with or without metal resinate, is dissolved in a solvent, for instance acetone. The plasticizer is added at any time, for instance just before the use of the varnish.

Preferably, varnish A of the above table will be used by room temperature below 10° C., and varnish B above 25° C. Between 10° and 25° C. a mixture of both varnishes is used. Experience proves that satisfactory results are obtained by using 4–5 cc. of varnish per square decimeter of surface area (1 square decimeter=15.5 sq. in.).

The varnish coating obtained by spraying is heated as already indicated until it is converted into enamel. If the heating occurs immediately after the varnish coating, bubbles (of solvent vapour) are eliminated and the heating is carried on till all the bubbles disappear. If the varnish has been dried before heating, the uneven surface, which is sometimes opaque, changes into a perfectly even, transparent film or coating. These changes are conspicuous. As a rule, the coating is allowed to cool to room temperature before stressing the mechanical part for elastic deformation.

It is also within the scope of this invention to provide improvements in the method thereof with a view to increasing the visibility of cracks and/or facilitating their formation.

According to a first embodiment a basic solution is applied to the part to be tested, already coated with a cracking enamel. This application may be carried out by spraying, coating or any other method before producing the cracks. It seems that by attacking the varnish coating the basic solution originates pits, that is, microscopic unevennesses acting as incipient cracks and therefore promoting the formation of cracks when the part is actually tested.

This basic solution is also applicable after the cracks are formed. In this case the cracks are deepened and made more visible.

As a basic solution according to this method, a 1% aqueous soda or caustic potash solution, or a 5% sodium carbonate or potash carbonate solution, or a 10% trisodic phosphate solution, or still a 20% ammonia solution, etc. . . . may be used, the above percentages being given solely by way of example as the concentrations may differ considerably from those stated.

According to another embodiment applicable to any part cracked for the purpose of visualizing mechanical and similar tests, the cracks are accentuated by means of an electro-chemical process.

In this case, the metal, or previously metallized part coated with a fissured cracking film is connected to the negative terminal of a source of electric energy. A brush soaked with electrolyte, for example an aqueous, slightly basic solution of a soda or potash salt, is connected to the positive terminal of the same source and passed over the film. The resulting electrolysis will form in the bottom of the cracks or fissures a deposit of caustic soda or potash which will vigorously attack the resin and therefore widen the cracks, particularly in the vicinity of the metal.

Excellent results are obtained by using for this purpose a 2% potash carbonate solution with a 24-volt potential difference.

It is advantageous to combine both improvements, for instance by firstly spraying a basic solution in order to deepen the initial cracks until they attain the underlying metal and secondly electrolysing the part in the above-defined manner.

Excellent results are obtained with a 5% potash carbonate basic solution followed by an electrolysis made with a mixture consisting of two parts per weight of potassium carbonate and one part per weight of potassium chloride per 100 parts of water. In this case the voltage may be reduced to 12 or even 6 volts.

In the drawing:

Fig. 1 illustrates diagrammatically a highly magnified crack or fissure resulting from the application of stress to a mechanical part coated with a cracking film of enamel.

Fig. 2 illustrates diagrammatically the application of the varnish or enamel surface.

Fig. 3 shows crack profiles.

Referring now more particularly to Fig. 1 it will be observed that crack 10 (Fig. 1) does not extend down to the metal part 11. By applying a basic solution the enamel surface 12 is attacked and the crack then extends according to dotted lines as indicated by numeral 13. Thus, the crack 10 is deepened until it reaches the metal 11 at location 14 (Fig. 2). By further extending the time of attack the outer enamel surface will run according to chain-dotted lines 15 (Fig. 1). The crack is now further widened and grows increasingly visible as the basic solution attacks the enamel.

As soon as the metal surface 11 is reached the application of the electrolytic process as indicated above will cause, upon contact with the metal at location 14, the formation of caustic soda or potash which attacks the varnish and causes increasingly thicker layers thereof to disappear around a centre substantially coincident with location 14, the varnish surface assuming approximately the position indicated by lines 14a, 16 and 17.

Referring especially to Fig. 2 it will be noted, that as soon as the metal surface 11 is reached, then one can apply the following electrolytic process. A source of direct circuit 18 has its negative pole connected to the metallic part 11, and its positive pole connected to an electrode 19, the electric circuit being closed by the slightly basic electrolyte 20. At location 14, on the bottom of the crack, there is a formation of sodium or potassium hydroxide, much more corrosive for the varnish which coats the metal part 11 than the initial solution of a slightly basic salt of sodium or potassium and causes increasingly thicker layers thereof to disappear around a centre substantially coincident with location 14, the varnish surface assuming approximately the position indicated by lines 16 and 17.

The extremely visible crack profile illustrated in Fig. 3 is thus very rapidly formed.

However, this visibility of cracks may be further improved by coloring them, for instance by causing a strongly tinted liquid to penetrate therein. In this case the method according to the invention makes it possible to reproduce several times the crack pattern obtained by using ink as a coloring liquid. The ink is sprayed over the fissured part, the latter is wiped and dried, so that the ink will remain inside the crack but not on the outer enameled surface.

According to a variation, the cracks are engraved in the metal by subjecting the fissured part to an electrolysis by an alternating current, or in reversing the direction of the electrolysis current, used as mentioned above for widening the crack.

If, as indicated above, a potassium chloride solution is used for this electrolysis, by reversing the current flow chlorine will be formed and the metal attacked thereby.

Having thus described the invention, what is claimed as new and desired to be secured by Letters Patent, is:

1. The method of strain-testing a mechanical part, which comprises coating said part with a varnish comprising a low boiling-point solvent, a resin having a Kramer-Sarnow point in the range of from 80° C. to 100° C. and a plasticizer,, heating said coated part until conversion of said coating to enamel, then allowing said part to cool to room temperature and subjecting the part to a predetermined strain producing cracks in said coating.

2. The method of investigating strains in a mechanical part, which comprises coating the part with a film of varnish comprising a low boiling solvent, a resin having a Kramer-Sarnow point within the range of from 80° C. to 100° C., a plasticizer and a fine inert powder, heating the coated part until said film has hardened, allowing the coated part to cool to room temperature, and then subjecting it to predetermined strains adapted to produce cracks in the film.

3. The method of testing a mechanical part, which comprises coating the part with a film of varnish comprising a low-boiling solvent, a resin having a Kramer-Sarnow point within the range of from 80° C. to 100° C., and a plasticizer, heating the coated part until conversion of the film into enamel occurs, allowing the part to cool to room temperature, subjecting the part to predetermined strains adapted to form cracks in said enamel film, and then applying a basic solution over the surface of the cracked enamel film.

4. The method of testing a mechanical part for strain analysis, which comprises coating the part with a film of varnish comprising a low-boiling solvent, a resin having a Kramer-Sarnow point within the range of from 80° C. to 100° C., and a plasticizer, heating the part until the conversion of the film into enamel takes place, allowing the part to cool to room temperature, subjecting the part to a strain adapted to form cracks in the coating film, and subjecting the cracked enamel film to an electrolytic treatment for deepening the cracks therein.

5. The method of testing a mechanical part, which comprises coating the part with a varnish comprising a low-boiling solvent, a resin having a Kramer-Sarnow point within the range of from 80° C. to 100° C., and a plasticizer, heating the part until conversion of the film into enamel takes place, then allowing the part to cool to room temperature, subjecting the part to a strain adapted to form cracks in the enamel film, applying a basic solution over the surface of the cracked film, and subjecting said enamel film to an electrolytic treatment for increasing the depth of the cracks therein.

6. The method of applying a film to a metal part for strain analysis of the latter at room temperature comprising the steps of first coating said part with a varnish, thereafter heating said part by means of a flame till a visible change in appearance of said varnish coating occurs, whereby the latter is changed from a dusty and clouded coating to a substantially even transparent film, then allowing said part to cool to room temperature to thereby impart brittle properties to said film, subjecting said part to predetermined stress for producing cracks in said film thereafter subjecting said cracked film to electrolytic treatment in which said part is connected to the negative pole of a direct-current source and the electrolyte is constituted by an aqueous diluted solution of a slightly basic alkaline salt selected from the group consisting of potassium carbonate and sodium orthophosphate for deepening and enlarging said cracks in said film.

7. A process of testing strains on a mechanical part, which comprises coating said part with a varnish containing a low boiling-point solvent, a resin having a Kramer-Sarnow softening point between 80° and 100° C., and tricresyl phosphate as plasticizer in proportion of 0.2 to 3 per cent of the weight of the resin, allowing the coating to dry at room temperature so that it becomes dusty and clouded, heating said coated part by a flame until the coating changes to a perfectly even, transparent film, allowing said part to cool at room temperature, and then subjecting said part to stress for producing stress-patterns in the form of cracks in said film.

8. A process of testing strains on a mechanical part, which comprises coating said part with a varnish containing a low boiling-point solvent, a resin having a Kramer-Sarnow softening point between 80° and 100° C., and tricresyl phosphate as plasticizer in proportion of 0.2 to 3 per cent of the weight of the resin, heating by flame immediately after coating until bubbles of solvent vapor are evolved to thereby leave a substantially even, transparent film, allowing said part to cool at room temperature, and then subjecting said part to stress for producing stress-patterns in the form of cracks in said film.

References Cited in the file of this patent

UNITED STATES PATENTS

| | | |
|---|---|---|
| 760,039 | Szczepanik | May 17, 1904 |
| 1,003,741 | Hesse | Sept. 19, 1911 |
| 2,186,014 | Ellis | Jan. 9, 1940 |
| 2,270,662 | Raney | Jan. 20, 1942 |
| 2,294,897 | Ellis | Sept. 8, 1942 |
| 2,325,116 | Ellis | July 27, 1943 |
| 2,420,646 | Bloom | May 20, 1947 |
| 2,428,559 | Ellis | Oct. 7, 1947 |
| 2,537,960 | Billington et al. | Jan. 16, 1951 |
| 2,590,927 | Brandt et al. | Apr. 1, 1952 |